United States Patent [19]

Simmons

[11] 4,278,842

[45] Jul. 14, 1981

[54] CIRCUIT FOR ELIMINATING SPURIOUS PULSES IN A DIAL PULSE STREAM

[75] Inventor: George H. Simmons, East Lansing, Mich.

[73] Assignee: Bell Telephone Laboratories, Incorporated, Murray Hill, N.J.

[21] Appl. No.: 45,970

[22] Filed: Jun. 6, 1979

[51] Int. Cl.³ .............................................. H04Q 1/36
[52] U.S. Cl. .................................. 179/16 EA; 328/165
[58] Field of Search ............ 179/16 E, 16 EA, 16 EC; 328/164, 165; 307/265; 235/92 PB, 92 TE

[56] References Cited

U.S. PATENT DOCUMENTS

| | | | |
|---|---|---|---|
| 3,504,290 | 3/1970 | Earle | 328/164 |
| 3,659,055 | 4/1972 | Witmore | 179/16 E |
| 3,671,875 | 6/1972 | Pento | 179/16 E |
| 3,772,474 | 11/1973 | Wisotzky | 179/16EA |
| 4,044,312 | 8/1977 | D'Ortenzio | 328/165 |

Primary Examiner—Alfred H. Eddleman
Assistant Examiner—Randall P. Myers
Attorney, Agent, or Firm—David R. Padnes

[57] ABSTRACT

A digital logic circuit for eliminating spurious transient pulses (21, 32) from among genuine pulses (51) in a binary dial pulse stream. The dial pulse stream is coupled to the circuit input (46). Output (47) is prevented from matching the input unless the duration of the input change exceeds a first time interval (57). Moreover, if the input change exceeds the first time interval and the input change was from a first to a second predetermined binary signal, then the new output signal is held constant for a second time interval (56) regardless of any change in the input signal.

4 Claims, 5 Drawing Figures

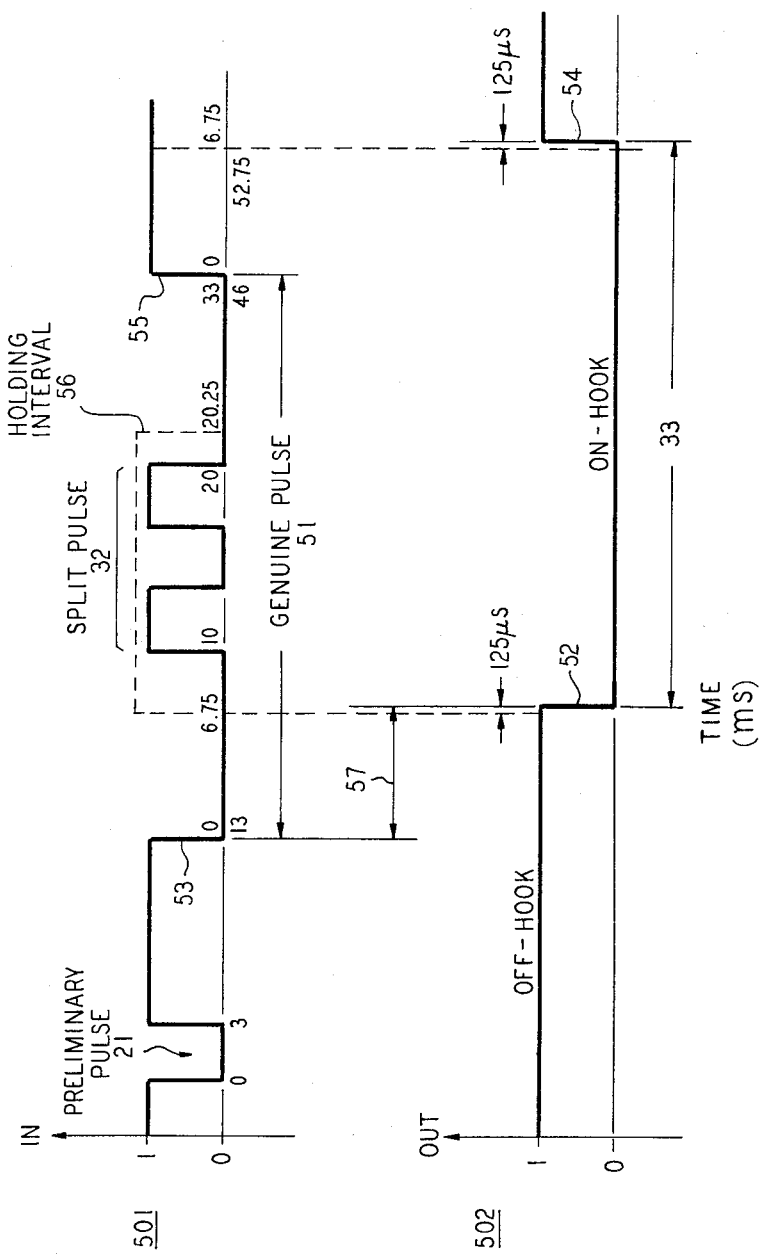

4,278,842

CIRCUIT FOR ELIMINATING SPURIOUS PULSES IN A DIAL PULSE STREAM

TECHNICAL FIELD

This invention relates to a digital logic circuit which eliminates spurious transient pulses in a dial pulse stream.

BACKGROUND OF THE INVENTION

Dial pulses are two-state or binary d.c. control signals that are used in telephone systems to direct customer cells to the desired destination. As such, they are susceptible to spurious transient pulses produced by equipment which transmits the dial pulses as well as other adjacent equipment in the telephone environment. These spurious pulses are deleterious and can be interpreted as genuine dial pulses.

One area of concern is the tandem interconnection of older trunk circuit equipment, utilizing electromechanical devices, to newer equipment which uses solid state devices. These solid state devices have faster response time than their electromechanical counterparts and therefore may respond to spurious transient signals. Relays within step-by-step outgoing trunk circuits, for example, normally generate transient pulses. These transients can be transmitted over digital facilities, such as T1 carrier, and interpreted as genuine dial pulses by solid state trunk circuits and switching machines in the receiver. This can result in a large volume of misdirected calls.

SUMMARY OF THE INVENTION

According to the present invention, spurious transient pulses on incoming digital transmission facilites are eliminated by means of a logic circuit in the receiving terminal. This circuit receives the incoming dial pulses and eliminates the spurious transients. Digital logic within the circuit accomplishes this elimination by a two-step process. First, the circuit output is prevented from responding to any input change that is less than a first time interval. Second, the circuit output is held constant for a second time interval if the input change persists for the first time interval and the change was from a first to a second predetermined input state. Accordingly, the circuit output, containing unaltered genuine dial pulses, is coupled onto the switch mechanism in the receiving terminal thereby eliminating the prior art problem of misdirected calls.

It is a feature of the present invention that the circuit is adapted for use within a channel unit of any of the widely used channel banks.

A further feature of the present invention is the exclusive use of digital logic elements which makes the circuitry suitable for integrated circuit packaging.

BRIEF DESCRIPTION OF THE DRAWINGS

FIG. 5 is a diagram depicting illustrative input and output signal waveforms, the latter corrected by the use of the embodiment of FIG. 4.

DETAILED DESCRIPTION

Figure 1:
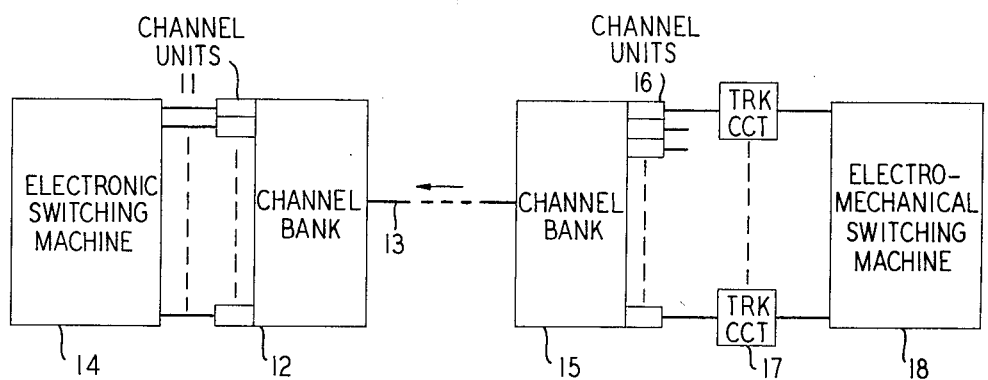
FIG. 1 shows a block diagram of a telephone transmission system to which the present invention pertains.

Turning to FIG. 1, the present invention is adapted for use within incoming channel units 11 of any of the widely used channel banks (e.g., D-2, D-3 or D-4). Channel bank 12 receives multiplexed digital message transmission and signaling information, such as dial pulses, from an incoming transmission facility 13 such as T1 Carrier. The output of the common equipment of channel bank 12 is coupled to a plurality of channel units 11 and then to switching machine 14. Electronic switching machine 14, which may be the well-known Bell System Nos. 2/2B, interprets the dial pulse signals and routes the call to the proper destination.

In similar fashion, the far end of transmission facility 13 is coupled to a similar channel bank 15 which multiplexes signals from a plurality of channel units 16. Outgoing signals are received by a channel unit 16 from a trunk circuit 17 connected to an electromechanical switching machine 18, such as the Bell System step-by-step (SXS) switching machine.

Dial pulses are binary or two-state signals. These states are often referred to as "on-hook" and "off-hook". For logical and illustrative purposes, the "off-hook" and "on-hook" states may be respectively represented by a logical "1" and "0".

Figure 2:
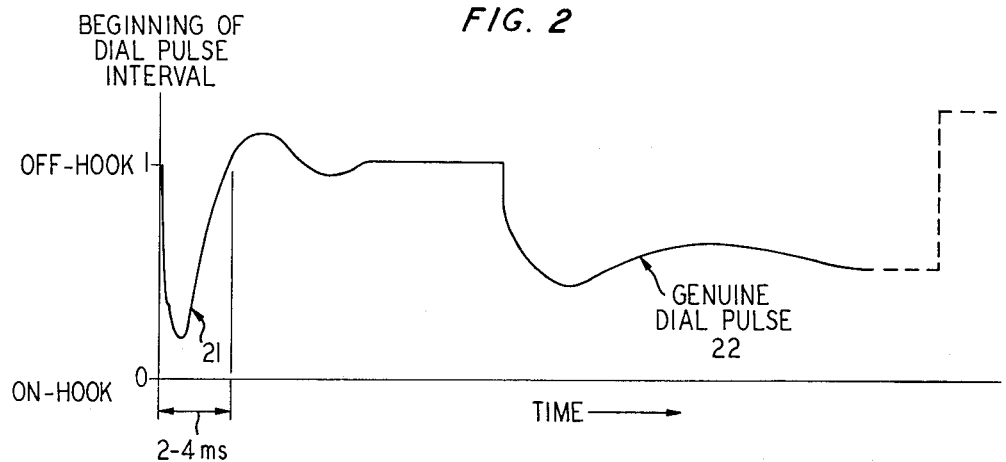
FIGS. 2 and 3 are representations of two spurious transient pulses eliminated by the present invention.
Figure 3:
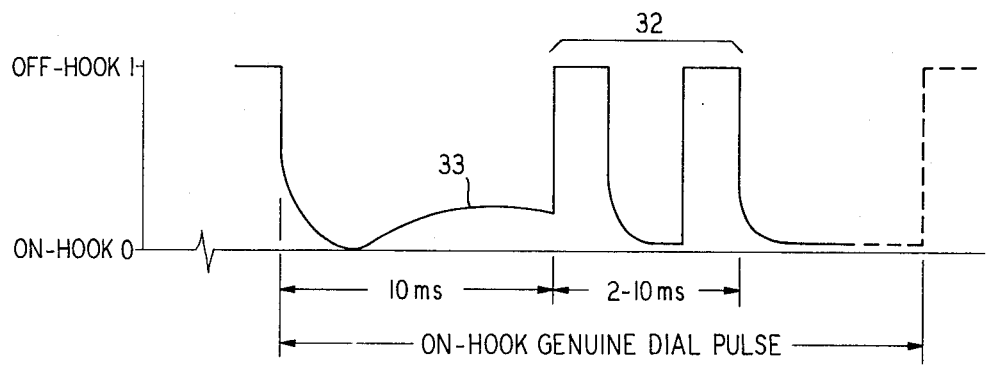

FIGS. 2 and 3 illustrate two common spurious transient pulses which are transmitted over transmission facility 13. These transients are generated by the improper operation of relays within an outgoing trunk circuit 17. Preliminary false pulse 21, as illustrated in FIG. 2, precedes the first genuine dial pulse 22 at the beginning of each dial pulse interval. Pulse 21 is caused by the collapse of current within a repeat coil in outgoing trunk circuit 17 and tends to increase the first dial digit by one pulse. While the duration of preliminary pulse 21 is typically two to four milliseconds (ms), channel units 16 quantize pulse 21 to 1.5 ms increments. The maximum duration of pulse 21, therefore, ranges from 3 to 4.5 ms. FIG. 3 illustrates split pulse 32 which is caused by the false reclosure, off-hook, of a make contact relay within a trunk circuit 17 during the dial pulse interval. When an on-hook or "0" pulse is received, a pulse repeating relay within a trunk circuit 17 will release but will tend to reoperate about 10 milliseconds (ms) later for a maximum duration of 10 ms. The duration of split pulse 32 and the duration of genuine pulse segment 33, which precedes split pulse 32, depends on pulse speed, percent break and relay adjustments. Split pulse 32 is also quantized by channel units 16 and has a duration of 9 to 10.5 ms.

Figure 4:
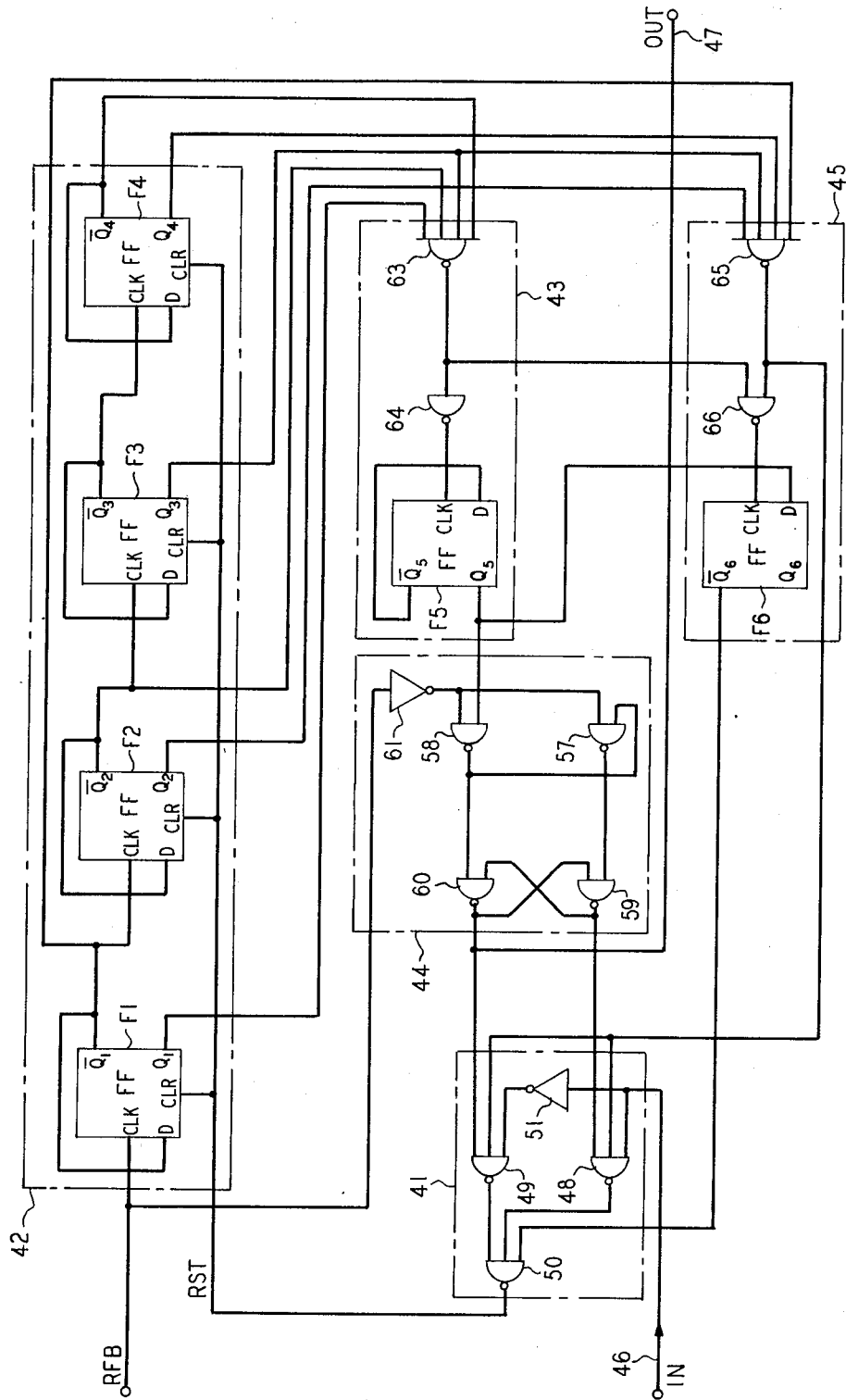
FIG. 4 is a schematic diagram of the disclosed embodiment of the present invention.

In accordance with the disclosed embodiment of the present invention, preliminary false pulse 21 and split pulse 32 are eliminated by means of the logic circuitry shown in FIG. 4. This logic circuitry comprises a comparator 41, a 4-bit ripple counter 42, a toggle 43, a latch 44 and a holding circuit 45.

Comparator 41 compares the circuit input signal 46 to the output signal 47. This function is provided by NAND gates 48, 49, and 50, and inverter 51. If input 46 and output 47 are different, comparator 41 enables counter 42 by setting control signal RST to logic "1". Alternatively, if the input 46 and output 47 are the same, comparator 41 inhibits counter 42 by setting control signal RST to logic "0". Thus, counter 42 normally starts when input 46 changes and stops when output 47 responds.

Two timing signals, the A and B signaling frame timing signals designated as RFA and RFB respectively, are used in conjunction with the logic circuitry of FIG. 4. RFA and RFB are 125 μs pulses with a repetition rate of 1.5 ms. These pulses are separated in time from one another by .75 ms with the RFA pulse always preceding the RFB pulse. The RFA and RFB timing signals are derived in the common equipment of the digital channel banks. The RFA and RFB signals are used to indicate the A and B signaling frames so that the signaling bits which occur every sixth frame can be separated out of the received digital bit stream. This digital signaling technique is well known, widely used in this country, and extensively described in the literature. (See, for example, the article "The D3 Channel Bank" by W. B. Gaunt et al, *Bell Laboratories Record*, August 1972, pages 229–233.) The RFA signal, through the use of a simple gating arrangement (not shown), gates the input dial pulse signals into the circuit of FIG. 4. The RFB signal is used as an input clock for the FIG. 4 circuit. The input 46 changes state during the RFA signal, while output 47 changes state during RFB. The above discussed time separation of RFA and RFB assures that input 46 and output 47 never change state simultaneously.

Counter 42 comprises four positive edge triggered D-type flip-flops, F1, F2, F3 and F4. The flip-flop outputs, $Q_1$, $\overline{Q_1}$, $Q_2$, $\overline{Q_2}$, $Q_3$, $\overline{Q_3}$, $Q_4$ and $\overline{Q_4}$ are under the control of timing signal RFB. Sixteen possible output states are provided by counter 42. State 5 outputs $Q_1=\overline{Q_2}=Q_3=\overline{Q_4}=1$, is used as a control signal to establish the circuit time delay via NAND gate 63 and triggers holding circuit 45 via NAND gates 63 and 66. State 14, $\overline{Q_1}=Q_2=Q_3=Q_4=1$, is fed to NAND gate 65 and is used to terminate the holding interval generated by holding circuit 45 and counter 42.

NAND gates 63 and 64 within toggle 43 receive signals from counter 42 and pass the same on to a positive edge triggered D-type flip-flop F5. Output $\overline{Q_5}$ of flip-flop F5 is tied back to the D input to invert the non-inverting output $Q_5$.

NAND gates 57, 58, 59, 60 and inverter 61 comprise latch 44 which gates and holds the $Q_5$ output state of flip-flop F5. Latch 44 is triggered by the negative transition edge of the RFB timing pulse via interconnection lead 62 and inverter 61. The output of NAND gate 60 is the circuit output 47. The holding interval is designed to make the circuit immune to input 46 signal changes during the time interval in which split pulses 32 are known to occur. For example, Nos. 2/2B ESS scan dial pulses every 10 ms. A genuine dial pulse can have a duration of 30 ms. However, in the presence of split pulses 32, this genuine pulse may appear as two 10 ms pulse segments surrounding split pulse 32. Therefore, split pulse 32 can cause a genuine dial pulse to be counted twice and thus increase the number of pulses counted.

To eliminate split pulse 32 a holding interval occurs after logic "1" or "0", off-hook to on-hook transitions of the circuit output signal 47. In the holding mode, comparator 41 is forced to keep counter 42 enabled regardless of the circuit input 46 and output 47 signal states. The holding interval is initiated by state 5 and terminated by state 14 of counter 42 via NAND gates 65 and 66. the holding circuit contains NAND gates 65 and 66 and a positive edge triggered D-type flip-flop F6. The D input of F6 is tied to the non-inverting output $Q_5$ of flip-flop F5. The inverting output of F6, $\overline{Q_6}$, is tied to NAND gate 50 of comparator 41.

To illustrate how the disclosed embodiment in FIG. 4 operates, reference is made to the waveforms 501 and 502 shown respectively in FIG. 5 as the input 46 and output 47 signals.

Initially, assume counter 42 is reset and output 47, $Q_5$ and $\overline{Q_6}$ are logic "1s". A logic "1" input 46 sets the output of comparator 41, i.e., the output of NAND gate 50, at logic "0". This logic "0" keeps counter 42 in the reset state. When preliminary pulse 21 occurs, the state of input 46 changes from logic "1" to logic "0". A logic "0" on input 46 forces the output of NAND gate 50 to logic "1". This logic "1" output puts counter 42 in the count state. As a result, counter 42 begins counting the RFB clock pulses. The first RFB clock pulse occurs 0.75 ms after input 46 has changed state. Subsequent RFB clock pulses occur 1.5 ms apart. Counter 42 must count five RFB clock pulses before output 47 can change state to match input 46. This corresponds to delaying input 46 by 6.75 ms. As shown in FIG. 5, preliminary pulse 21 lasts for only 3 ms before going back to logic "1". Accordingly, counter 42 resets before five RFB clock pulses have occurred and waveform 502 remains at the logic "1" state. Thus, preliminary pulse 21 is ignored.

Since genuine dial pulse 51 lasts longer than 6.75 ms, counter 42 reaches state 5. State 5 of counter 42 forces the output of NAND gate 63 to logic "0". This, in turn, forces the outputs of NAND gates 64 and 66 to logic "1s". NAND gate 64 toggles flip-flop F5 to toggle its $Q_5$ output from logic "1" to logic "0". Simultaneously, NAND gate 66 forces flip-flop F6 to take the value on its D input prior to flip-flop F5 toggling and apply the inverse of that value to its $\overline{Q_6}$ output, i.e., $\overline{Q_6}$ changes from logic "1" to logic "0".

The logic "0" on $\overline{Q_6}$ is applied to NAND gate 50 to force counter 42 to remain in the counting state. On the negative transition edge of the fifth RFB clock pulse, latch 44 gates the $Q_5$ value of flip-flop F5 to the output of NAND gate 60. Latch 44 introduces 125 μs of delay in the circuit output path to allow the holding signal, $\overline{Q_6}$ to reach comparator 41 before the output of NAND gate 60 changes state. This delay eliminates any possible race condition between output 47, which would reset counter 42, and holding signal $\overline{Q_6}$ which would keep counter 42 counting. FIG. 5 shows the logic "1" to logic "0" output transition 52 after a total delay of 6.875 ms from the "1" to "0" transition 53 of waveform 501.

To insure that split pulse 32 is ignored, $\overline{Q_6}$ remains a logic "0" throughout the duration of the probable occurrence of split pulse 32. During this holding interval 56, input 46 signals are ignored and the output 47 remains a logic "0". Holding interval 56 lasts for 13.375 ms after the output 47 has changed from a logic "1" to "0". After 13.375 ms the holding interval is terminated and counter 42 is automatically reset when state 14 is reached. State 14 forces the output of NAND gate 65 to logic "0" which forces the output of NAND gate 66 to logic "1". The output of NAND gate 66 in turn forces flip-flop F6 to take a zero value on the D input which produces a logic "1" on its $\overline{Q_6}$ output to terminate the holding interval. A logic "0" output of NAND gate 65 resets counter 42 by forcing the output of counter 41, the output of NAND gate 50, to logic "0" via NAND gates 48 and 49. In the output waveform 502, split pulse 32 has been eliminated by holding circit 45.

When input 46 changes to logic "1" with the output 47 at logic "0" the pulse elimination process is again initiated. If the input 46 logic "1" lasts longer than 6.75 ms, output 47 will toggle to match input 46 and counter 42 will reset. Holding circuit 45 will not be invoked since the output transition is logic "0" to logic "1". However, if the input logic is less than 6.75 ms, counter 42 will reset and output 47 will remain at its existing state logic "0". As shown, logic "0" to logic "1" transition 54 of waveform 502 occurs 6.875 ms after transition 55 of waveform 501.

I claim:

1. In a communication system wherein two level dial pulse signals contain both genuine and spurious transient pulses, a spurious pulse elimination circuit which receives said dial pulse signals as an input signal and generates genuine pulses as an output signal, said circuit characterized by means (41) for comparing the input (46) and output (47) signal levels of said circuit and generating therefrom a control signal when the level of said input signal differs from the level of said output signal, said control signal being continuously present until the levels of said input and output signals are the same, counting means (42) responsive to said control signal for counting for a preselected time interval and being reset to zero by a predetermined state of said control signal, said counting means also being reset to zero once the count has continued for the preselected time interval, means (43, 44) coupled to said counting means for preventing said output signal level from matching a change in input signal level unless the duration of said change in input signal level exceeds a first particular count within said preselected time interval, and means (45) coupled to said counting means for holding said output signal level constant when said change in input signal level is from a first to a second predetermined signal level, the holding means being activated by said first particular count and the holding means being deactivated once a second particular count is counted by said counting means.

2. The circuit of claim 1 wherein said holding means holds said output signal constant by forcing said comparison means to generate said control signal to prevent the resetting of said counting means.

3. The circuit of claim 2 wherein said first predetermined signal level is a logic "1" and said second predetermined signal level is a logic "0".

4. The circuit of claim 3 wherein said counting means comprises a 4-stage ripple counter.

* * * * *